United States Patent
Tsuchida (10) Patent No.: US 7,769,091 B2
(45) Date of Patent: Aug. 3, 2010

(54) COMMUNICATION SYSTEM

(75) Inventor: Katsumi Tsuchida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 958 days.

(21) Appl. No.: 11/551,073

(22) Filed: Oct. 19, 2006

(65) Prior Publication Data

US 2007/0116135 A1 May 24, 2007

(30) Foreign Application Priority Data

Nov. 21, 2005 (JP) ............................... 2005-335260

(51) Int. Cl.
*H04L 27/00* (2006.01)
(52) U.S. Cl. .................. 375/259; 375/286; 375/288; 375/272; 375/304; 375/334; 370/509; 370/497; 370/490; 370/489
(58) Field of Classification Search ................ 375/259, 375/242, 286, 288, 272, 303, 334; 370/509, 370/497, 490, 489
See application file for complete search history.

(56) References Cited

U.S. PATENT DOCUMENTS 4,674,084 A * 6/1987 Suzuki et al. ............... 370/509

FOREIGN PATENT DOCUMENTS

| JP | 56-149151 | 11/1981 |
|----|-----------|---------|
| JP | 5-53945 | 3/1993 |
| JP | 8-265308 | 10/1996 |
| JP | 10-190573 | 7/1998 |
| JP | 2004-328103 | 11/2004 |

* cited by examiner

*Primary Examiner*—Phuong Phu
(74) *Attorney, Agent, or Firm*—Oblon, Spivak, McClelland, Maier & Neustadt, L.L.P.

(57) ABSTRACT

A communication system includes a first device and a second device connected to the first device by a single communication line. The first device includes a first transmitting portion which transmits to the second device a pulse signal set to a predetermined cycle that differs according to data, and a first receiving portion which reads data transmitted from the second device based on a voltage value of a transmission signal transmitted over the communication line. The second device includes a second transmitting portion which transmits to the first device a voltage signal set to a predetermined voltage value that differs according to the data, and a second receiving portion which reads data transmitted from the first device based on a pulse signal cycle of the transmission signal transmitted over the communication line.

13 Claims, 8 Drawing Sheets

COMMUNICATION SYSTEM

The disclosure of Japanese Patent Application No. 2005-335260 filed on Nov. 21, 2005 including the specification, drawings and abstract is incorporated herein by reference in its entirety.

BACKGROUND OF THE INVENTION

1. Field of the Invention

The invention relates to a communication system which is provided with a first device and a second device that are connected by a single communication line, and which performs two-way simultaneous communication between the two devices.

2. Description of the Related Art

Japanese Patent Application Publication No. JP-A-8-265308, for example, describes a communication system that performs two-way simultaneous communication between two stations using a single communication line. The communication system described in that publication transmits data from a first station to a second station using a pulse signal set at a duty ratio that differs according to the data, and transmits data from the second station to the first station using a pulse signal having an amplitude value that differs according to the data. At the first station, the data transmitted from the second station is classified based on the amplitude value of the pulse signal transmitted over the communication line, while at the second station, the data transmitted from the first station is classified based on the duty ratio of the pulse signal transmitted over the communication line. As a result, even if data is transmitted from the two stations simultaneously over the single communication line, all of the data is able to be read without interference.

In the foregoing communication system, however, the pulse signal transmitted from the first station changes the duty ratio according to the data and its cycle is always fixed. Therefore, the data transmission speed from the first station to the second station ends up being fixed. If that communication method is employed for data communication in a system in a vehicle provided with vehicle state control units for controlling a plurality of vehicle states, in which those control units operate by transmitting and receiving data to and from each other, for example, the data transmission speed when an abnormality is detected ends up being the same as the data transmission speed during normal operation, which is undesirable. That is, when an abnormality is detected, an abnormality processing command is preferably transmitted to the appropriate control unit quicker than data is transmitted during normal operation. This, however, is not possible with the foregoing communication method.

SUMMARY OF THE INVENTION

This invention thus provides a communication system that includes a first device and a second device connected to the first device by a single communication line. The first device includes a first transmitting portion which transmits to the second device a pulse signal set to a predetermined cycle that differs according to data, and a first receiving portion which reads data transmitted from the second device based on a voltage value of a transmission signal transmitted over the communication line. The second device includes a second transmitting portion which transmits to the first device a voltage signal set to a predetermined voltage value that differs according to data, and a second receiving portion which reads data transmitted from the first device based on a pulse signal cycle of the transmission signal transmitted over the communication line.

According to this structure, the first transmitting portion of the first device transmits a pulse signal and the cycle of this pulse signal is set differently depending on the data. As a result, the transmission speed of the data transmitted to the second device also changes depending on the data. For example, a shorter cycle of the pulse signal results in the data being transmitted to the second device at a faster speed. Therefore, good communication control is able to be achieved by setting the cycle of the pulse signal according to the type of data such that a data transmission speed appropriate for that type of data is achieved.

BRIEF DESCRIPTION OF THE DRAWINGS

The foregoing and/or further objects, features and advantages of the invention will become apparent from the following description of preferred embodiments with reference to the accompanying drawings, in which like numerals are used to represent like elements and wherein.

DETAILED DESCRIPTION OF THE PREFERRED EMBODIMENTS

In the following description, the present invention will be described in more detail in terms of exemplary embodiments.

Figure 1:
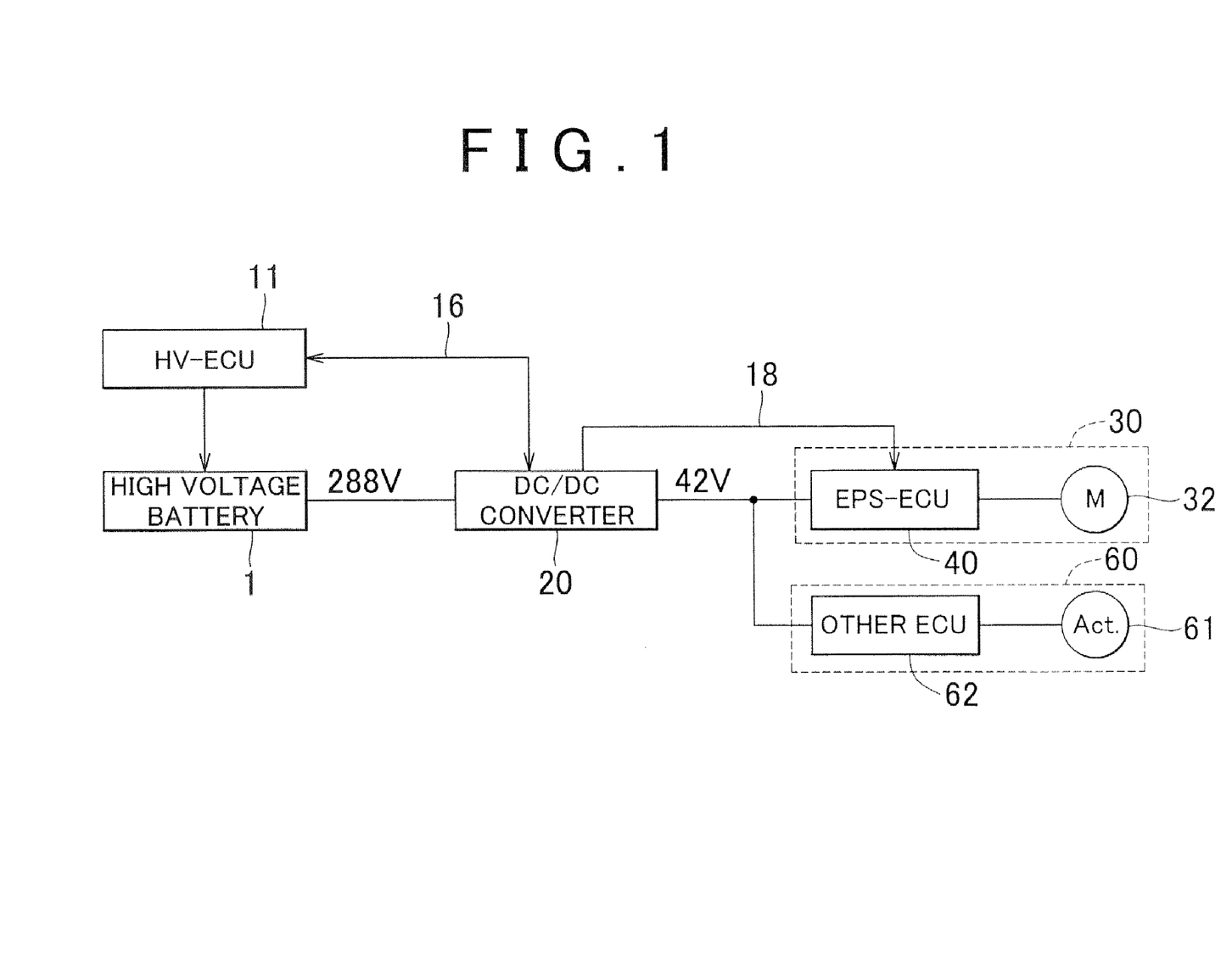
FIG. 1 is a block diagram schematically showing a power supply system and signal transmission system of a power supply control system provided with a communication system according to one example embodiment of the invention.
Figure 2:
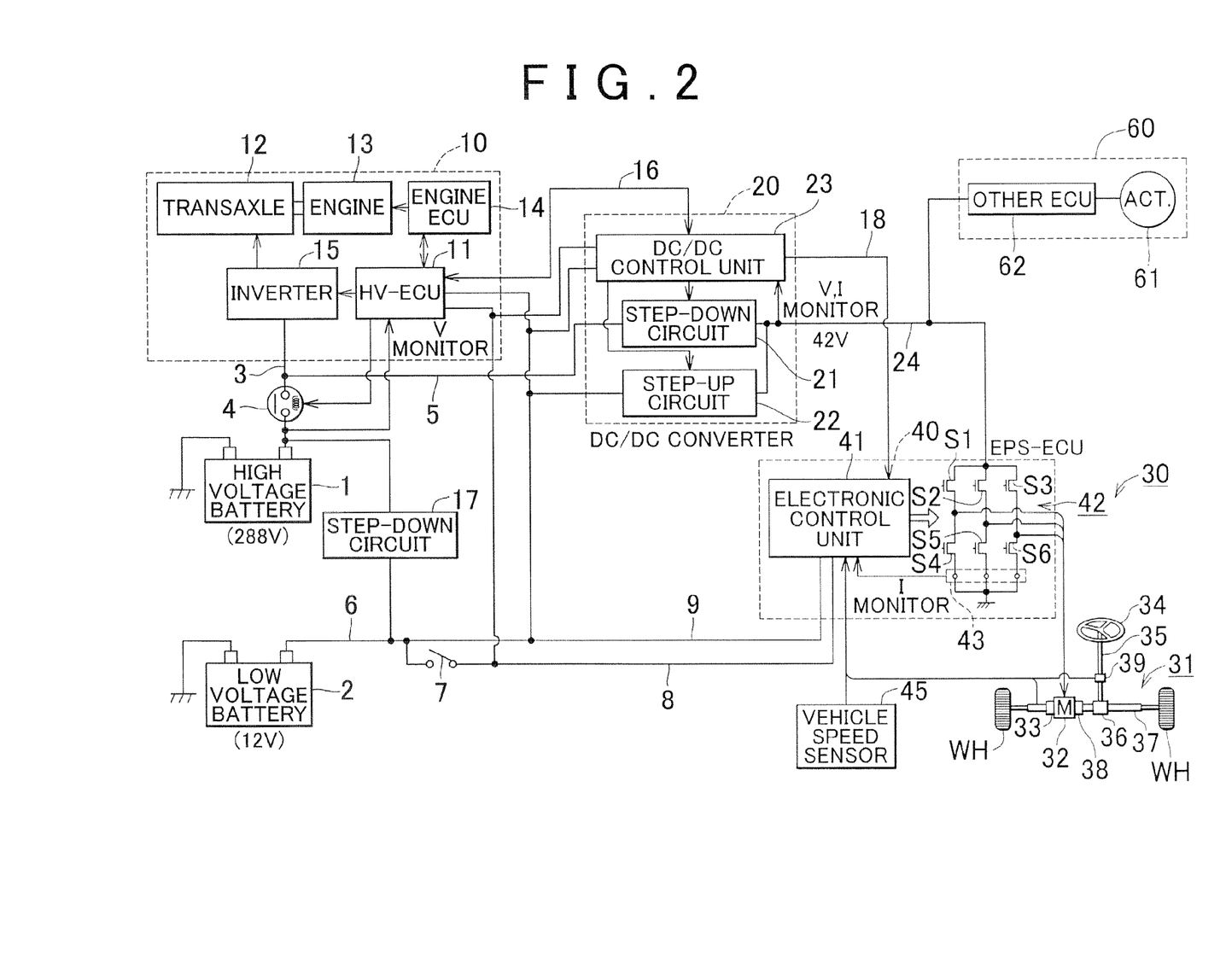
FIG. 2 is a circuit diagram schematically showing the power supply control system provided with the communication system according to the example embodiment.

Hereinafter, a communication system according to one example embodiment of the invention will be described with reference to the accompanying drawings. FIG. 1 is a block diagram of a power supply control system of a vehicle provided with a communication system according to this example embodiment. FIG. 2 is a block diagram schematically showing that power supply control system. The communication system of this example embodiment performs communication between a hybrid control unit 11 (i.e., HV-ECU 11) and a DC/DC converter 20 shown in FIG. 1. First the power supply control system of a vehicle to which this communication system may be applied will be described.

This power supply control system includes a high voltage battery (main battery) 1 which is used as a power source for driving a hybrid system 10, a low voltage battery (auxiliary battery) 2 which is used by the general vehicle control system, a DC/DC converter 20 which reduces (i.e., steps down) the voltage of the high voltage battery 1 or increases (i.e., steps up) the voltage of the low voltage battery 2, and a hybrid control unit (hereinafter simply referred to as "HV-ECU") 11 which controls both operations of the hybrid system 10 and operations of the DC/DC converter 20. ECU is an abbreviation of Electronic Control Unit.

First the hybrid system 10 will be described. The hybrid system 10 includes a transaxle 12 that includes a main motor which is an electric actuator for running the vehicle, a generator, a power split mechanism, reduction gears, and a differential gear (these are omitted in the drawing), an engine 13 which is an internal combustion engine for driving the vehicle, an engine control unit 14 (hereinafter referred to as "engine ECU 14") which controls the operation of the engine, an inverter 15 for converting direct current power of the high voltage battery 1 into three phases and controlling the main motor of the transaxle 12 on and off, and the HV-ECU 11 which controls operations within the hybrid system 10.

The main portion of the HV-ECU 11 is a microcomputer. The HV-ECU 11 calculates motor torque and engine output based on the operating state of the engine according to various signals indicative of, for example, the accelerator opening amount, the shift lever position and the like from various sensors, and outputs required values to the engine ECU 14 as well as controls the output of the inverter 15.

In this example embodiment, the high voltage battery 1 has a rated voltage of 288 volts (V). A high voltage main power supply line 3 which serves as the power supply path of the high voltage battery 1 is connected to the inverter 15. A system main relay 4 (hereinafter referred to as "SMR 4") for allowing and interrupting the supply of power from the high voltage power supply is provided midway in the high voltage main power supply line 3. Also, a high voltage power supply branch line 5 is branch-connected to the high voltage main power supply line 3 on the side of the SMR 4 that is closer to the load. Power from the high voltage battery 1 is supplied to the DC/DC converter 20 via this high voltage power supply branch line.

Meanwhile in this example embodiment, the low voltage battery 2 has a general rated voltage of 12 V. A low voltage main power supply line 6 which serves as the power supply path for the low voltage battery 2 branches off into an ignition (IG) linked low voltage power supply line 8 which supplies power and is operatively linked to the on/off operation of an ignition switch 7, and a regular supply low voltage power supply line 9 which supplies power but is not operatively linked to the ignition switch 7. These lines 8 and 9 both supply low voltage power to the HV-ECU 11, the DC/DC converter 20, and an electric power steering apparatus 30. Although omitted in FIG. 2, there are many more electrical loads to which power is supplied from the low voltage battery 2.

Further, a step-down circuit 17 which serves as the auxiliary assist power supply for stepping down the voltage to 12 V is connected to the high voltage main power supply line 3 of the high voltage battery 1. The output of this step-down circuit 17 is connected to the low voltage main power supply line 6.

The DC/DC converter 20 includes the step-down circuit 21 which steps down (i.e., reduces) the 288 V power supplied from the high voltage power supply branch line 5 to a predetermined voltage (42 V in this example embodiment), a step-up circuit 22 that steps up (i.e., increases) the 12 V power supplied from the regular supply low voltage power supply line 9 to a predetermined voltage (33 V in this example embodiment), and a DC/DC control unit 23 that controls the operations of the step-down circuit 21 and the step-up circuit 22. This DC/DC control unit 23 is connected to the HV-ECU 11 by a single communication line 16. The DC/DC control unit 23 and the HV-ECU 11 are able to communicate two ways simultaneously via this communication line 16.

The step-down circuit 21 for example generates direct current power of a predetermined voltage after once converting input voltage to alternating current voltage by a transistor bridge circuit, stepping it down to a low voltage with a transformer, and then rectifying and smoothing it out. Also, the step-up circuit 22 for example generates power within a step-up coil provided in series in the power line by running current intermittently to the step-up coil, and then steps up the voltage by outputting that power.

The output terminals of the step-down circuit 21 and the step-up circuit 22 are connected to a common DC/DC converter output line 24 (hereinafter simply referred to as "converter output line 24"). The DC/DC control unit 23 monitors the voltage in this converter output line 24 and feedback-controls the operation of the step-down circuit 21 or the step-up circuit 22 to make the output voltage match a target voltage. The DC/DC control unit also monitors the output current and checks for current surges.

The converter output line 24 is connected as a motor driving power source to the electric power steering apparatus 30 as well as to other running control apparatuses 60 (only one of which is shown in the drawing). These other running control apparatuses 60 may be, for example, control systems that consume a lot of power and are provided with an electric actuator 61 and an ECU 62 for driving the electric actuator 61. Some examples include a brake control system, a stabilizer system, and a suspension system.

The electric power steering apparatus 30 includes a steering assist mechanism 31 that applies a steering assist force to steered wheels WH, and a steering assist control unit (hereinafter simply referred to as "EPS-ECU") 40 for driving an electric motor 32 provided in the steering assist mechanism 31.

The steering assist mechanism 31 converts rotation around the axis of a steering shaft 35 which is operatively linked to a rotating operation of a steering wheel 34 into motion in the axial direction of a rack bar 37 by a rack and pinion mechanism 36, and steers the left and right steered wheels WH according to movement in the axial direction of the rack bar 37. The electric motor 32 is assembled onto the rack bar 37. The electric motor 32 applies an assist force to the rotating operation of the steering wheel 34 by driving the rack bar 37 in the axial direction via a ball screw mechanism 38 according to that rotation. Also, a rotation angle sensor 33 which outputs a signal indicative of the motor rotation angle is provided on the electric motor 32. Further, a steering torque sensor 39 is assembled onto the steering shaft 35.

The EPS-ECU 40 includes an electronic control unit 41 which calculates the amount of electricity to needed by the electric motor 32 to apply a predetermined steering assist force, and a motor drive circuit 42 which drives the electric motor 32 in response to a control signal from the electronic control unit 41.

The motor drive circuit 42 is formed of a three-phase inverter which uses six switching elements S1, S2, S3, S4, S5, and S6 (a MOSET is used in this example embodiment). Power for driving the motor is supplied by the converter output line 24 of the DC/DC converter 20. The motor drive circuit 42 also includes a current sensor 43 that measures the amount of current flowing through each phase of the electric motor 32.

The main portion of the electronic control unit 41 is a microcomputer. This electronic control unit 41 inputs detection signals from the steering torque sensor 39 and a vehicle speed sensor 45 that detects the running speed of the vehicle, and calculates the amount of electricity needed by the electric motor 32 based on these detection signals. The electronic control unit 41 also generates the desired steering assist force by controlling the operation of the electric motor 32 based on a signal from the rotation angle sensor 33 and the detected value from the current sensor 43.

This electronic control unit 41 is connected to the DC/DC control unit 23 of the DC/DC converter 20 via a communication line 18 so as to be able to receive a gradual change command, to be described later, transmitted from the DC/DC control unit 23.

Figure 3:
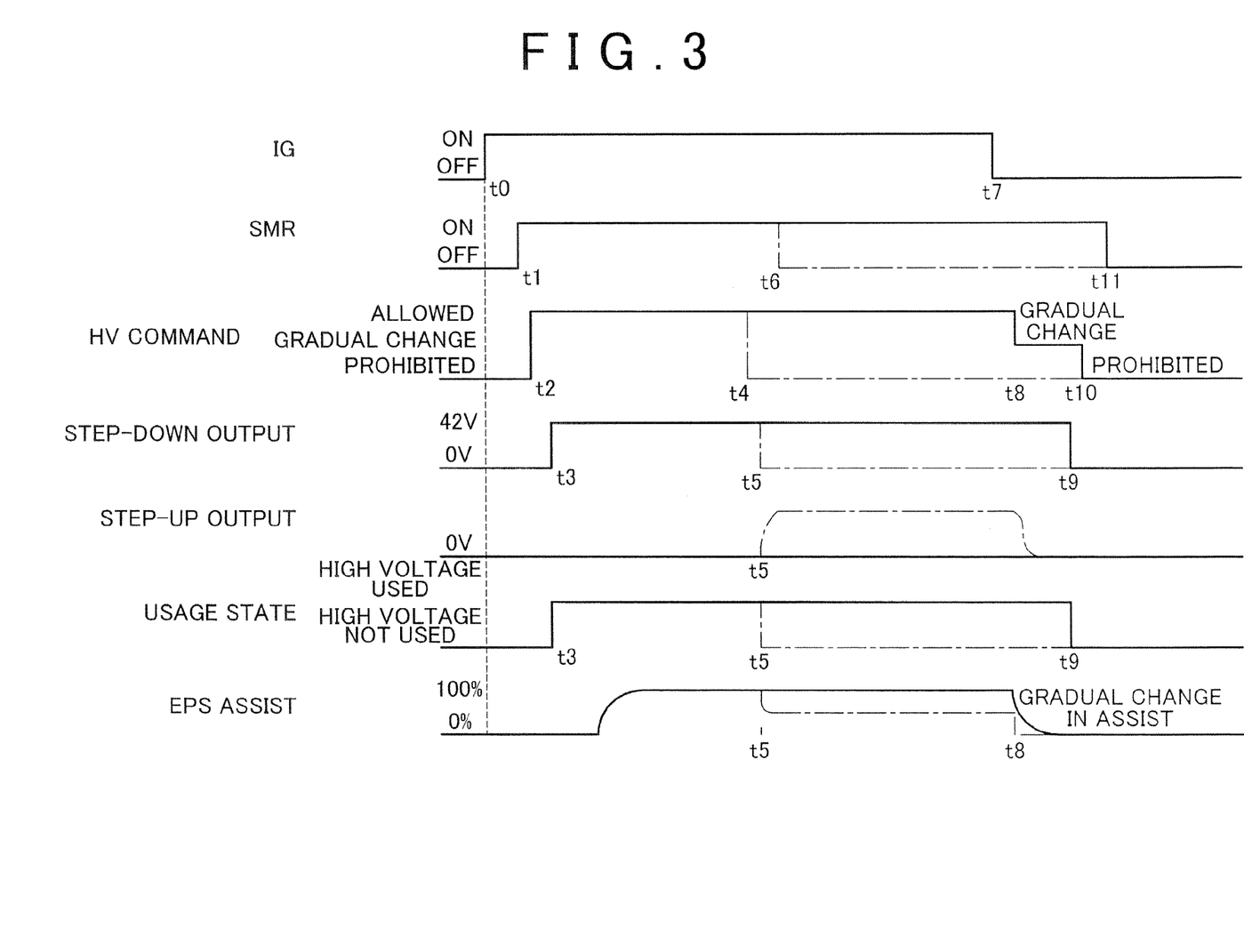
FIG. 3 is a timing chart showing a voltage conversion operation and a command signal of the power supply control.
Figure 4A:
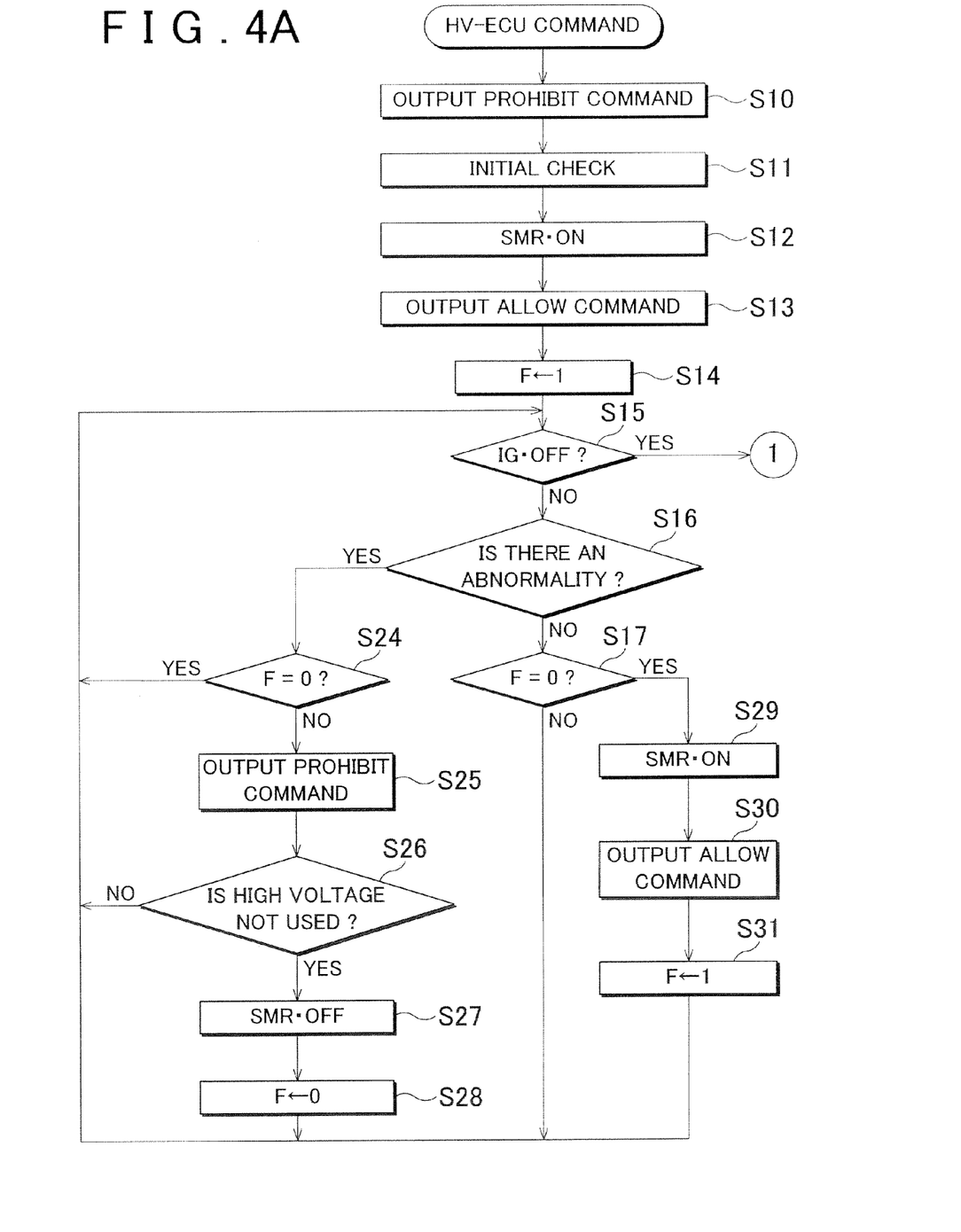
FIGS. 4A and 4B are flowcharts illustrating a power supply command control routine executed by an HV-ECU.
Figure 4B:
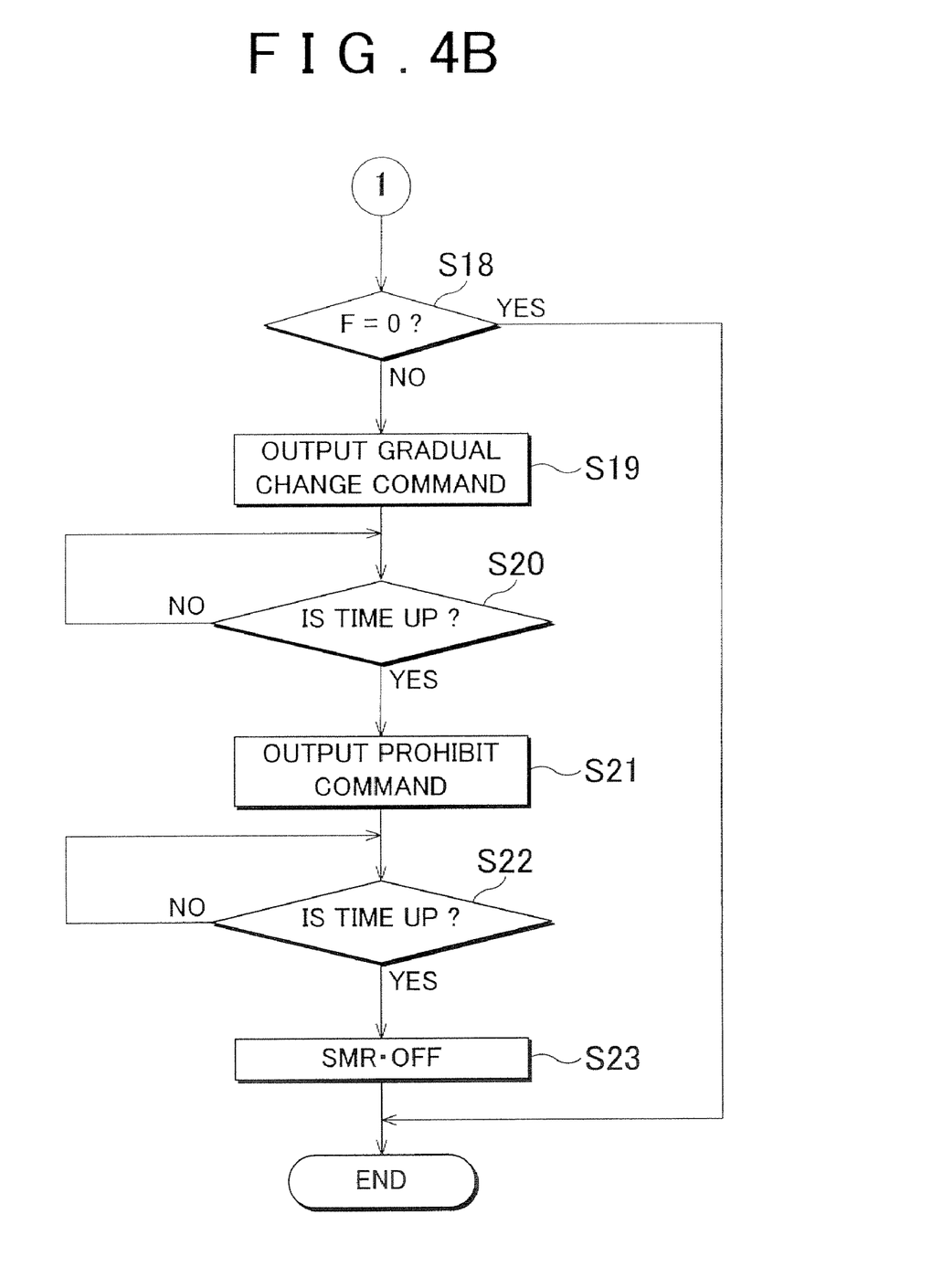
Figure 5:
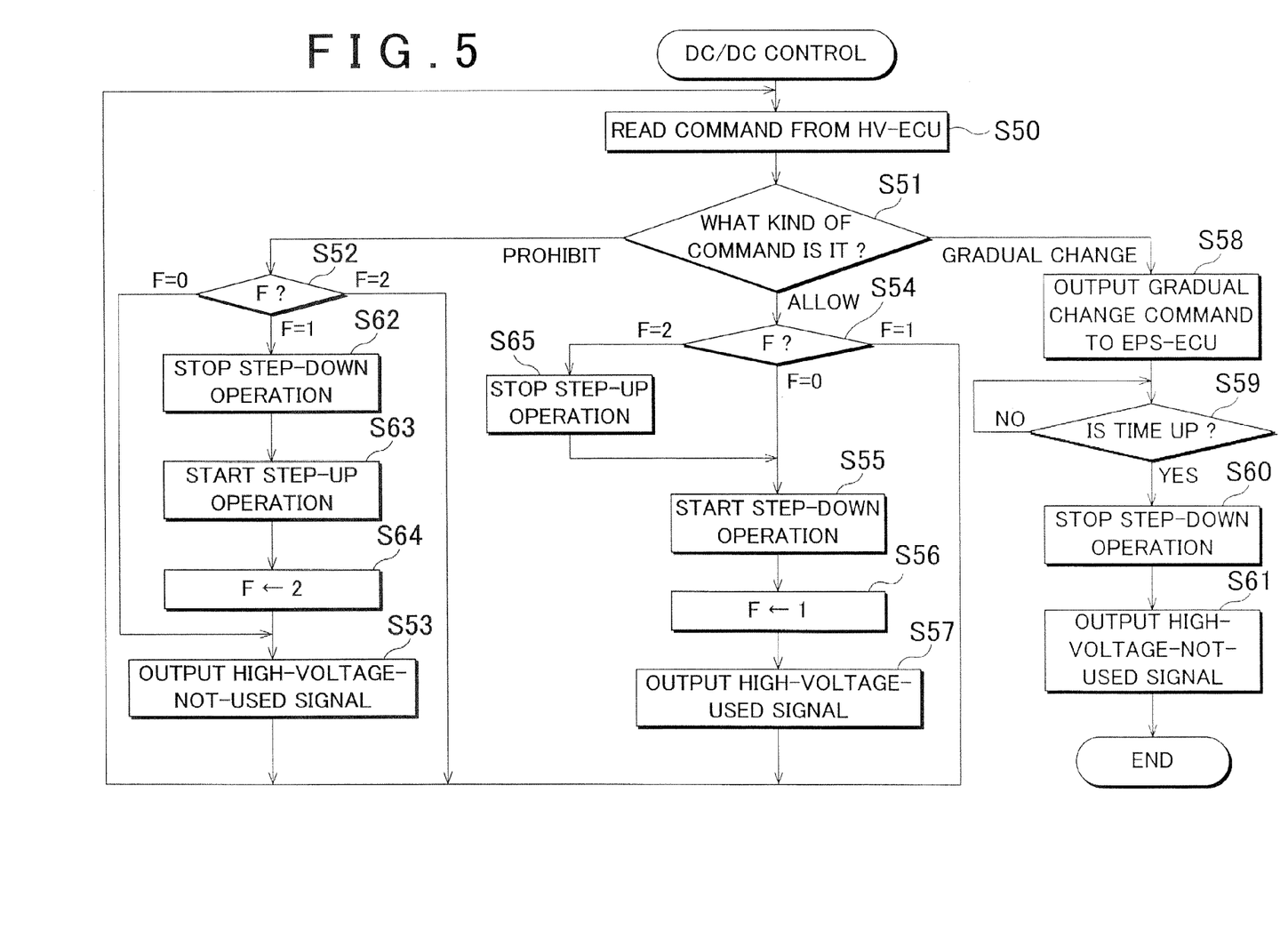
FIG. 5 is a flowchart illustrating a voltage conversion control routine executed by a DC/DC control unit.

Next, the power supply control by the HV-ECU 11 and the DC/DC converter 20 will be described. FIG. 3 is a timing chart relating to the power supply control in this example embodiment. Also, FIGS. 4A and 4B are flowcharts of a command control routine executed by the HV-ECU 11 and FIG. 5 is a flowchart of a voltage conversion control routine executed by the DC/DC control unit 23. Both of these routines are stored as control programs in a memory unit, not shown. The command control routine and the voltage conversion control routine are performed in parallel. First, the command control routine executed by the HV-ECU 11 will be described with reference to FIGS. 3, 4A and 4B.

This control routine starts when the ignition switch 7 is turned on. First, the HV-ECU 11 outputs a prohibit command to the DC/DC control unit 23 for a predetermined period of time (S10). During this time, an initial check of the hybrid system is performed (S11). Once the initial check is complete, the SMR 4 is turned on so that power from the high voltage battery 1 is supplied to the hybrid system 10 (S12; time t1 in FIG. 3). The predetermined period of time for which the prohibit command is output may be an elapsed time measured by a timer or may end when the initial check is complete.

Continuing on, an allow command which allows power from the high voltage battery 1 to be used is output to the DC/DC control unit 23 (S13; time t2 in FIG. 3), and a flag F is set to F=1 (S14). This flag F is set to F=0 when the SMR 4 is off and the usage of power from the high voltage battery 1 is prohibited, and is set to F=1 when the SMR 4 is on and the usage of power from the high voltage battery 1 is allowed. When this control routine starts, the flag F is set at F=0. The command signal output by the HV-ECU 11 to the DC/DC control unit 23 will hereinafter be referred to as an "HV command".

In this way, power from the high voltage battery 1 is supplied to the DC/DC converter 20, and the DC/DC control unit 23 operates the step-down circuit 21 and outputs 42 V power in response to an allow command from the HV-ECU 11 (time t2 in FIG. 3). Although the control on the DC/DC converter 20 side will be described later with reference to FIG. 5, the points in that control which are related to FIG. 3 will be described here.

Once 42 V power is output from the secondary side of the DC/DC converter 20, the HV-ECU 11 repeatedly checks the state of the ignition switch 7, checks for abnormalities, and checks the state of the flag F (S15, S16, and S17). The abnormality check in step S16 is performed by checking for abnormalities in the hybrid system 10 and abnormalities (such as a ground-fault abnormality or a voltage abnormality) in the high voltage battery 1. Also, the determination in step S17 is "NO" because the flag F was set to F=1 in step S14.

Accordingly, this state continues as long as the ignition switch 7 is turned on and no abnormalities are detected. That is, the SMR 4 remains on and the allow command continues to be output to the DC/DC control unit 23. Therefore, during this time, power from the high voltage battery 1 that has been stepped down to 42 V is supplied from the converter output line 24 to the electric power steering apparatus 30 and the other running control apparatuses 60.

When the ignition switch 7 is turned off (time t7 in FIG. 3), the determination in step S15 changes to "YES" and the process proceeds on to step S18 where the state of the flag F is checked. In this case, because the flag F is set to F=1, the process proceeds on to step S19 where a gradual change command is output to the DC/DC control unit 23 (time t8 in FIG. 3). This gradual change command is a command which gives advance notice that the supply of power will stop so that when the supply of power from the converter output line 24 is stopped, the load of the electric power steering apparatus 30 and the like will not be cut off suddenly.

Continuing on, the HV-ECU 11 then checks whether a predetermined period of time has passed after the gradual change command was output (S20), and if so (i.e., YES in step S20), then outputs a prohibit command to the DC/DC control unit 23 (S21; time t10 in FIG. 3). In this case, after the predetermined time has passed after receiving the gradual change command, the DC/DC control unit 23 stops the step-down operation of the step-down circuit 21 (time t9 in FIG. 3). The HV-ECU 11 then checks whether a predetermined period of time has passed after the prohibit command was output (S22), and if so (i.e., YES in step S22), then outputs an interrupt signal to the SMR 4 to interrupt the supply of high voltage power to the hybrid system 10. The control routine then ends (S23).

If, on the other hand, the ignition switch 7 is turned on (i.e., NO in step S15) and an abnormality is detected when the step-down circuit 21 is performing a step-down operation (i.e., YES in step S16), the process proceeds on to step S24 where the state of the flag F is checked. In this case, because the flag F is set to F=1, the process proceeds on to step S25 where a prohibit command is output to the DC/DC control unit 23 (time t4 in FIG. 3). A usage state signal from the DC/DC control unit 23 is read (S26) and once a high-voltage-not-used signal is received (time t5 in FIG. 3), the SMR 4 is turned off (S27; time t6 in FIG. 3). The flag F is then set to F=0 (S28) after which this state continues.

In this way, when an abnormality is detected, the SMR 4 is turned off so that the supply of power from the high voltage battery 1 is interrupted. For example, if the voltage of the power from the high voltage battery 1 falls equal to or below a predetermined voltage, this is detected as a battery abnormality. Turning off the SMR 4 thus prevents an abnormality from occurring in the hybrid system 10 as well as prevents an unstable supply of power to the control apparatuses that receive power via the converter output line 24, such as the electric power steering apparatus 30, thereby improving safety.

Further, when, after an abnormality was detected and the SMR 4 was turned off to interrupt the supply of power from the high voltage battery 1, the abnormality check determination then changes to "no abnormality" (i.e., NO in step S16), the process then proceeds on to step S17. In this case, because the flag F is set to F=0, the determination in step S17 is "YES". Accordingly, the process proceeds on to step S29 where the SMR 4 is turned on thus allowing power from the high voltage battery 1 to be used, an allow command is output to the DC/DC control unit 23 (S30), and the flag F is set to F=1 (S31). For example, when the voltage of the power from the high voltage battery 1 returns to the reference voltage after falling, the determination in step S16 switches from "abnormality" to "no abnormality". Once the voltage returns to normal, the SMR 4 is turned on and an allow command is output to the DC/DC control unit 23.

This process is repeated until the ignition switch 7 is turned off, at which time the gradual change command and prohibit command are output such that the SMR 4 is turned off, as described above, after which the control routine ends. Incidentally, if the ignition switch 7 is turned off while a prohibit command is being output, the determination in step S18 changes to "YES" and the control routine directly ends.

Next, a voltage conversion control routine performed on the DC/DC control unit 23 side will be described with reference to the flowchart in FIG. 5 and the timing chart in FIG. 3. This control routine is performed in parallel with the command control routine executed by the HV-ECU 11 described above and starts when the ignition switch 7 is turned on.

First, a command from the HV-ECU 11 is read (S50) and the type of that command is determined (S51). When this control routine starts, the HV-ECU 11 outputs a prohibit command. The process in this case therefore proceeds on to step S52 where the setting of a flag F is checked. This flag F is different from the flag F used in the command control routine described above. That is, this flag F indicates the operating state of the DC/DC converter 20. When neither the step-down circuit 21 nor the step-up circuit 22 are operating, the flag F is set to F=0. When the step-down circuit 21 is operating, the flag F is set to F=1, and when the step-up circuit 22 is operating, the flag F is set to F=2. When this control routine starts the flag F is set to F=0. Therefore, when the vehicle is started, the determination in step S52 is "F=0" so the process proceeds on to step S53 where a high-voltage-not-used signal is output to the HV-ECU 11.

The DC/DC control unit 23 regularly outputs a usage state signal to the HV-ECU 11 which indicates whether power from the high voltage battery is being used. The high-voltage-not-used signal is output when the step-down circuit 21 is not operating. The process then returns to step S50 where the command signal from the HV-ECU 11 is read. This command signal (i.e., HV command) is read repeatedly and when an allow signal is received from the HV-ECU 11 (S51; time t2 in FIG. 3), the setting of the flag F is checked (S54). In this case, the flag F was set at F=0 the last time so the determination in step S54 is "F=0". Accordingly, the process proceeds on to step S55 where the step-down circuit 21 starts to be operated. The flag F is then set to F=1 (S56) and a high-voltage-used signal is output to the HV-ECU 11 (S57; time t3 in FIG. 3).

Once the DC/DC control unit 23 starts to operate the step-down circuit 21, it monitors the output voltage and adjusts it to match a target voltage (42 V in this example embodiment). Moreover, the DC/DC control unit 23 also monitors the output current. If a current surge is detected, the DC/DC control unit 23 outputs current surge information to the electronic control unit 41 of the EPS-ECU 40 via the communication line 18. As a result, the electronic control unit 41 adjusts the motor drive circuit 42 and reduces the upper limit value of electricity supplied to the electric motor 32 to prevent the step-down circuit 21 from overheating.

In this way, once the step-down circuit 21 starts to operate and power is supplied from the high voltage battery 1 to the electric power steering apparatus 30 and the other running control apparatuses 60, this state is continued until the command from the HV-ECU 11 changes (S54; F=1). The DC/DC control unit 23 starts to operate the step-down circuit 21 while transmitting to the electronic control unit 41 of the EPS-ECU 40 via the communication line 18 information indicating that power has started to be supplied from the high voltage battery 1. The EPS-ECU 40 starts assist control at 100% capacity based on this transmission. Accordingly, the electric power steering apparatus 30 receives the supply of high voltage power and is thus able to obtain sufficient steering assist torque.

If the ignition switch 7 is turned off (time t7 in FIG. 3) in this state, the HV-ECU 11 transmits a gradual change command to the DC/DC control unit 23, as described above (time t8 in FIG. 3). Upon receiving this gradual change command from the HV-ECU 11 (S51; gradual change), the DC/DC control unit 23 outputs a gradual change command to the electronic control unit 41 of the EPS-ECU 40 (S58). This gradual change command gives advance notice that power will stop being supplied from the high voltage battery 1.

The EPS-ECU 40 that receives this gradual change command then gradually reduces the upper limit current value supplied to the electric motor 32 so that steering assist torque is gradually reduced. That is, the EPS-ECU 40 gradually reduces the steering assist torque able to be output so that the steering operation feel does not suddenly change due to the steering assist torque suddenly being cancelled by a sudden stop in the supply of power.

After the command is output in step S58, operation of the step-down circuit 21 stops (S60, time t9 in FIG. 3) after a predetermined period of time has passed. The timing at which the step-down operation is stopped is after a set period of time, which is measured by a timer, has passed (S59) and takes into account the time required by the EPS-ECU 40 for the gradual change operation. Also, at the same time as the step-down circuit 21 stops operating, a high-voltage-not-used signal is output to the HV-ECU 11 (S61). The control routine then ends. The HV-ECU 11 interrupts the supply of power from the high voltage battery 1 by turning off the SMR 4 based on a high-voltage-not-used signal output from the DC/DC control unit 23.

When the HV-ECU 11 transmits a prohibit command (time t4 in FIG. 3) while the step-down circuit 21 is operating, the determination in step S51 changes from "allowed" to "prohibited", after which the state of the flag F is checked in step S52. Immediately after the command from the HV-ECU 11 changes from "allowed" to "prohibited", the determination in step S52 is "F=1" because the flag F is set at F=1. Operation of the step-down circuit 21 is then stopped in step S62 while operation of the step-up circuit 22 is started in step S63 (time t5 in FIG. 3). Then the flag F is set to F=2 and a high-voltage-not-used signal is output to the HV-ECU 11 (S53).

Accordingly, the supply of power between the high voltage battery 1 and the electric power steering apparatus 30 or the other running control apparatuses 60 is interrupted by stopping operation of the step-down circuit 21, while stepped-up power from the low voltage battery 2 starts to be supplied to the electric power steering apparatus 30 or the other running control apparatuses 60 by starting operation of the step-up circuit 22. In this case, the DC/DC control unit 23 starts to operate this step-up circuit 22 and transmits information that indicates that power has started to be supplied from the low voltage battery 2 to the electronic control unit 41 of the EPS-ECU 40 via the communication wire 18. The EPS-ECU 40 then performs assist control in a save mode, operating at or below a predetermined power based on this transmission.

This step-up operation of the low voltage battery 2 continues unless the command from the HV-ECU 11 changes. When this step-up operation of the low voltage battery 2 is being performed and the command from the HV-ECU 11 changes from "prohibited" to "allowed", the determination in step S51 changes to "allowed" and the state of the flag F is checked in step S54. In this case, the flag F is set to F=2 so the process proceeds on to step S65 where the step-up operation of the step-up circuit 22 is stopped. Then the process proceeds on to step S55 where the step-down circuit 21 starts to be operated again. The flag F is then set to F=1 (S56) and a high-voltage-used signal is output to the HV-ECU 11 (S57).

In this way, the control routine changes the operation of the DC/DC converter 20 according to the command from the HV-ECU 11. Therefore, the operation of the DC/DC converter 20 is not controlled by the EPS-ECU 4 as is in the related art so output from the DC/DC converter 20 can be stably used in the other running control apparatuses 60 as well. That is, the DC/DC converter 20 is controlled by the HV-ECU 11 so the output from the DC/DC converter 20 is not only able to be used by the electric power steering apparatus 30, but also by the various running control apparatuses 60. As a result, its range of use broadens which increases its general applicability as a power supply apparatus.

Also, because a voltage conversion command is not transmitted using a CAN communication system, as it is in the related art, the amount of data transmitted in the CAN is able to be reduced, thus reducing the load on the CAN communication system a corresponding amount. Furthermore, the wiring cost for the communication lines can also be reduced compared with the conventional system. Also, if an abnormality such as a voltage shortage in the battery occurs, the use of power from the high voltage battery 1 is prohibited to prevent an unstable supply of power to the electric power steering apparatus 30 and the other running control apparatuses 60. Moreover, even if the use of power from the high voltage battery 1 is prohibited, power from the low voltage battery 2 is supplied after being stepped up, thereby enabling good operation of the electric power steering apparatus 30 and the actuators 61 of the other running control apparatuses 60, which improves safety, reliability, and vehicle performance.

Figure 6:
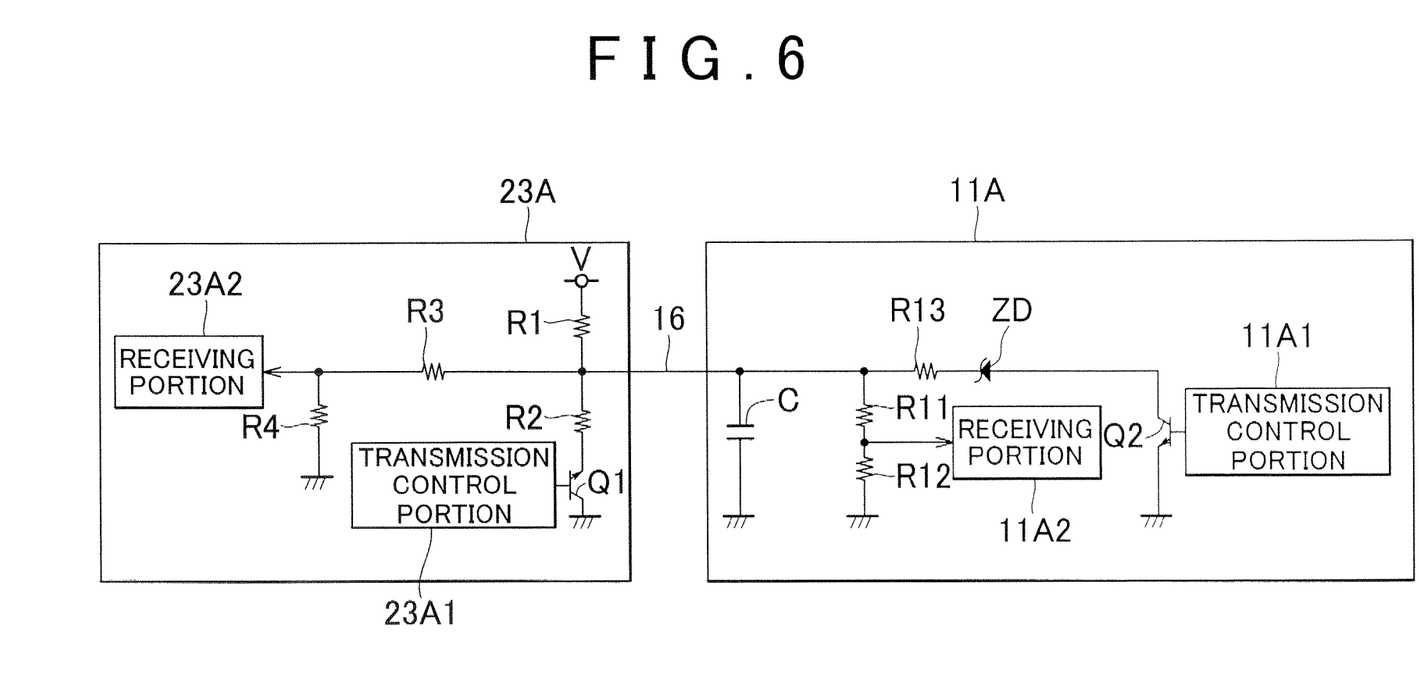
FIG. 6 is a block diagram schematically showing a communication control system.

Next, the system by which two-way simultaneous communication is performed between the HV-ECU 11 and the DC/DC control unit 23, i.e., the communication system of this example embodiment, will be described. FIG. 6 shows the configuration of communication portions in the HV-ECU 11 and the DC/DC control unit 23. The left side in the drawing represents a communication portion 23A of the DC/DC control unit 23 and the right side in the drawing represents a communication portion 11A of the HV-ECU 11.

The communication portion 23A of the DC/DC control unit 23 includes resistance elements R1, R2, R3, and R4, a transistor Q1, a transmission control portion 23A1, and a receiving portion 23A2. The communication line 16 is connected between the resistance element R1 and the resistance element R2 provided in series between a ground and a predetermined voltage power source V in the circuit. The transmission control portion 23A1 outputs a control signal to a base of the transistor Q1 which serves as a switch element provided in series with these resistance elements R1 and R2, by which it switches the transistor Q1 on and off. Accordingly, by switching the transistor Q1 on and off, the transmission control portion 23A1 changes the voltage output to the communication line 16, thereby transmits a signal indicating the operating state (i.e., operating state data) of the DC/DC converter 20 to the HV-ECU 11. That is, when the step-down circuit 21 of the DC/DC converter 20 is operating, a "high-voltage-used" signal is output, and when the step-down circuit 21 is not operating, a "high-voltage-not-used" signal is output.

Figure 7:
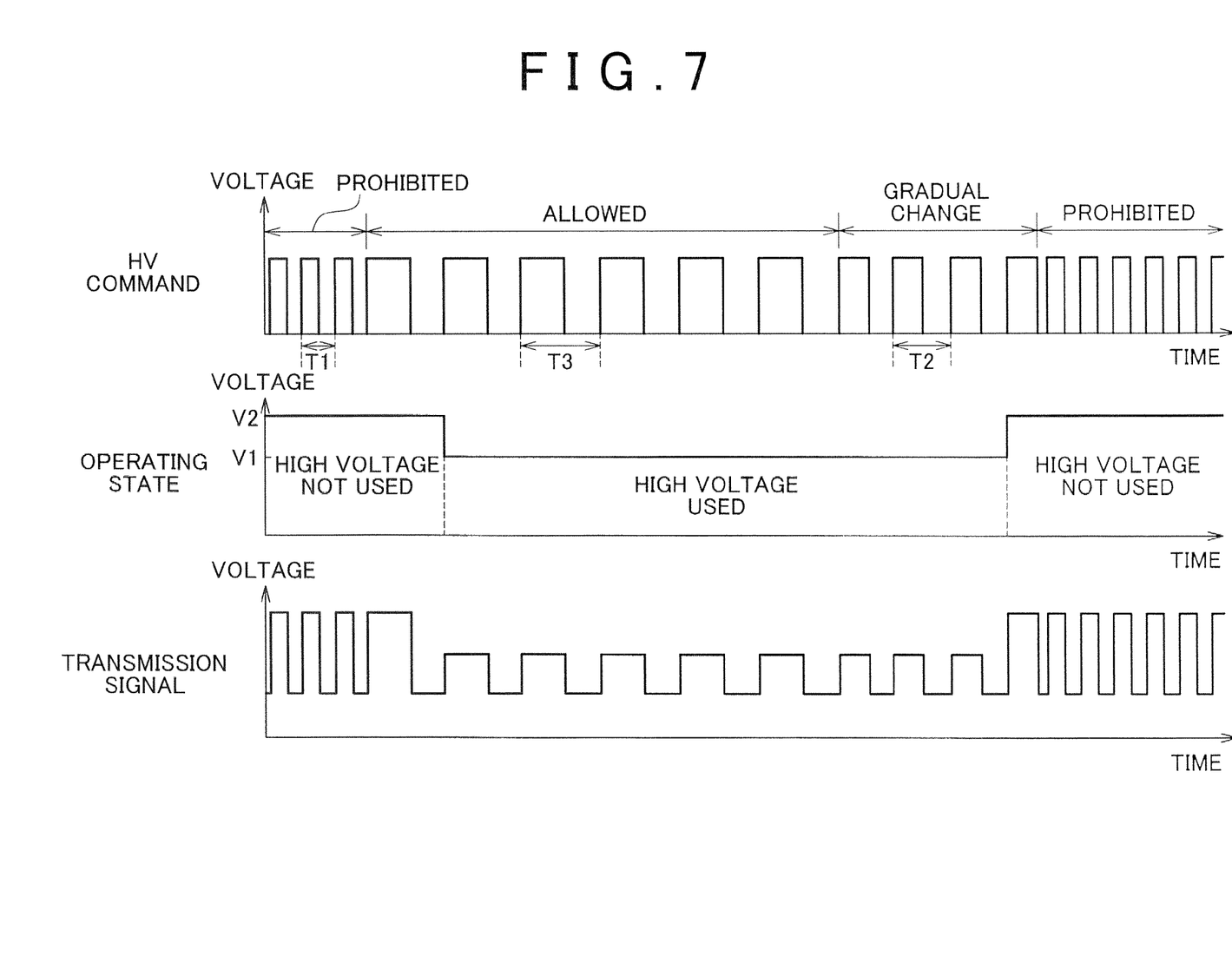
FIG. 7 is a view shows a signal waveform in the communication control system.

In this case, as shown in the middle of FIG. 7, for a "high-voltage-used" signal, the transmission control portion 23A1 turns the transistor Q1 on and sets the operating state signal to a predetermined first voltage V1. For a "high-voltage-not-used" signal, the transmission control portion 23A1 turns the transistor Q1 off and sets the operating state signal to a predetermined second voltage V2 (V2>V1). That is, this communication portion 23A employs a voltage amplitude modulation method which changes the transmission signal (i.e., transmission data) by changing the magnitude of the output voltage. The waveform of the operating state signal in FIG. 7 is the waveform of the output terminal voltage when the communication line 16 is open.

Further, the receiving portion 23A2 which reads the signal transmitted from the communication portion 11A of the HV-ECU 11 is provided in the communication portion 23A in a position where the communication line 16 and the resistance element R4 provided in series are connected.

Meanwhile, the communication portion 11A of the HV-ECU 11 includes resistance elements R1, R12, and R13, a zener diode ZD, a transistor Q2, a condenser C, a transmission control portion 11A1, and a receiving portion 11A2. The resistance element R13, the zener diode ZD, and the transistor Q2 are provided in series between the communication line 16 and the ground, while the resistance elements R11 and R12, which are provided in series, and the condenser C which serves as a noise filter are provided in parallel with those.

The transmission control portion 11A1 switches the transistor Q2 on and off by outputting a pulse signal to a base of the transistor Q2 that serves as a switch element. In this case, the transmission control portion 11A1 outputs a pulse signal of a predetermined duty ratio (50% in this example embodiment) to the base of the transistor Q2, and switches the HV command signal transmitted over the communication line 16 by switching the cycle of this pulse signal. That is, the HV-ECU 11 transmits an HV command signal (i.e., HV command data) indicating "allowed", "prohibited", or "gradual change" to the DC/DC control unit 23, and employs a pulse cycle modulation method that switches between these three types of command signals by changing the cycle of the pulse signal input to the transistor Q2.

In this example, the HV command signal is such that the "prohibited" command signal is set at the shortest cycle T1, and the "allowed" command signal is set at the longest cycle T3, as shown in the top portion of FIG. 7. Also, the "gradual change" command signal is set at a cycle T2 that is in between the shortest cycle T1 and the longest cycle T3 (i.e., T1<T2<T3).

Also, the receiving portion 11A2 is provided at a connecting portion between the resistance elements R11 and R12. This receiving portion 11A2 reads the signal transmitted from the communication portion 23A of the DC/DC control unit 23 by reading the voltage value at that connecting portion. The zener diode ZD keeps the HV command signal at or above a predetermined voltage with respect to the ground and is able to detect an on failure (i.e., a ground-fault failure) in the circuit if one occurs.

The communication portions 11A and 23A structured in this way are connected together by the single communication line 16. Accordingly, the output waveform of the transmission signal transmitted over this communication line 16 is one in which the HV command signal and the operating state signal have been synthesized, as shown in the lower portion of FIG. 7.

At the receiving portion 11A2 in the communication portion 11A of the HV-ECU 11, the type of signal (i.e., "high-voltage-used" or "high-voltage-not-used") transmitted from the DC/DC control unit 23 is determined by converting the voltage between the resistance elements R11 and R12 into a digital signal using an A/D converter, not shown, and reading the voltage of the transmission signal, i.e., the voltage amplitude (i.e., swing) of the pulse signal.

Meanwhile, at the receiving portion 23A2 in the communication portion 23A of the DC/DC control unit 23, the cycle of the pulse signal is obtained by detecting an edge of that signal (i.e., the rise or fall of the pulse signal) from the change in the voltage at the point where the resistance element R3 and the resistance element R4 are connected. In this way, the type of HV command signal (i.e., "prohibited", "allowed", or "gradual change") output from the HV-ECU 11 is determined.

According to the communication system between the HV-ECU 11 and the DC/DC control unit 23 described above, the HV command signal output from the HV-ECU 11 is classified according to the pulse cycle. Furthermore, the transmission speed of the signal for the prohibit command, which is an important signal, is increased by shortening its cycle. Therefore, a prohibit command can be recognized earlier in the DC/DC control unit 23 so that the supply of power from the high voltage battery 1 is able to be stopped earlier in the event that an abnormality is detected, which improves both safety and vehicle reliability. Moreover, when two-way communication is performed using only the voltage modulation method, the setting range of the threshold value ends up becoming quite narrow when tolerance is included. In this example embodiment, however, this problem is eliminated by combining the voltage modulation method with the pulse cycle modulation method.

The HV-ECU 11 having the communication portion 11A of this example embodiment corresponds to a first device of the invention. The DC/DC control unit 23 having the communication portion 23A in this example embodiment corresponds to a second device of the invention. The transmission control portion 11A1 in this example embodiment corresponds to a first transmitting portion of the invention. The receiving portion 11A2 in this example embodiment corresponds to a first receiving portion of the invention. The transmission control portion 23A1 in this example embodiment corresponds to a second transmitting portion of the invention. The receiving portion 23A2 in this example embodiment corresponds to a second receiving portion of the invention. The DC/DC converter 20 in this example embodiment corresponds to an operating apparatus (i.e., voltage converting apparatus) provided with the second device of the invention. Also, the functioning portion (i.e., the process in step S16 in FIG. 4A) of the HV-ECU 11 that detects a voltage abnormality in the high voltage battery 1 in this example embodiment corresponds to an abnormality detecting portion of the invention. Further, the operating state signal and the HV command signal in this example embodiment correspond to data of this invention. In particular, the HV command signal corresponds to command data of this invention.

While a power supply control system having the communication system has been described with reference to an example embodiment, the invention is not limited to the example embodiment. To the contrary, various modifications are also possible within the scope of the invention.

For example, in the foregoing example embodiment, the invention is applied to a communication system between devices provided in a vehicle. The invention may also be applied to something other than a vehicle. Also, when the invention is applied to a vehicle, it is not limited to communication between the HV-ECU 11 and the DC/DC control unit 23, but may be applied to communication between various vehicle state control units. Moreover, in the foregoing example embodiment, the cycle of a pulse signal is set to be the shortest for data transmitted when an abnormality is detected, but the invention is not necessarily limited to this as long as the cycle of the pulse signal for information that needs to be transmitted the fastest in the system to which the communication system is applied is shortened. Also, the settings of the numerical values (of the battery voltage, the step-down voltage, and the step-up voltage) and the like in the foregoing example embodiment are only examples and may be set as appropriate.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A communication system comprising:
a first device; and
a second device connected to the first device by a single communication line,
wherein the first device includes a first transmitting portion which transmits to the second device a pulse signal set to a predetermined cycle that differs according to command data, and a first receiving portion which reads data transmitted from the second device based on a voltage value of a transmission signal transmitted over the communication line; and
the second device includes a second transmitting portion which transmits to the first device a voltage signal set to a predetermined voltage value that differs according to the data, and a second receiving portion which reads the command data transmitted from the first device based on a pulse signal cycle of the transmission signal transmitted over the communication line, and an operating apparatus that operates based on the command data transmitted from the first device,
wherein the first device further includes an abnormality detecting portion that detects an abnormality, and sets the command data transmitted to the second device to a pulse signal including a shortest cycle of a plurality of cycles when the abnormality is detected.

2. A communication system comprising:
a first device; and
a second device connected to the first device by a single communication line,
wherein the first device includes a first transmitting portion which transmits to the second device a pulse signal set to a predetermined cycle that differs according to data, and a first receiving portion which reads data transmitted from the second device based on a voltage value of a transmission signal transmitted over the communication line; and
the second device includes a second transmitting portion which transmits to the first device a voltage signal set to a predetermined voltage value that differs according to the data, and a second receiving portion which reads data transmitted from the first device based on a pulse signal cycle of the transmission signal transmitted over the communication line,
wherein the second device includes an operating apparatus that operates based on command data transmitted from the first device, and the first transmitting portion of the first device transmits command data that controls operation of the operating apparatus to the second device by a pulse signal of a predetermined cycle set according to the type of that command data.

3. The communication system according to claim 2, wherein the first device includes an abnormality detecting portion that detects an abnormality, and sets the command data transmitted to the second device to a pulse signal including a shortest cycle of a plurality of cycles when the abnormality is detected.

4. The communication system according to claim 3, wherein the first device and the second device are provided in a vehicle and the abnormality detecting portion detects the abnormality in the vehicle.

5. The communication system according to claim 4, wherein the second device includes a voltage converting apparatus which serves as the operating apparatus and converts power from an onboard battery to a predetermined voltage and supplies the power to an electrical load in the vehicle, and the first device transmits to the second device command data that controls the operation of the voltage converting apparatus, and sets the command data transmitted when the abnormality in the onboard battery is detected by the abnormality detecting portion to a pulse signal having the shortest cycle.

6. The communication system according to claim 1, wherein when the second device receives the pulse signal including the shortest cycle of the plurality of cycles, the operating apparatus ceases operation.

7. The communication system according to claim 1, wherein
a first cycle of the plurality of cycles is the shortest cycle that is set when the abnormality is detected,
a second cycle of the plurality of cycles is set when operation of the operating apparatus is to cease after a predetermined time, and
when a pulse signal including the second cycle is received by the second device, the operating apparatus ceases operation after a predetermined time passes.

8. The communication system according to claim 7, wherein
a third cycle of the plurality of cycles is set when operation of the operating apparatus is allowed, and
when a pulse signal including the third cycle is received by the second device, the operating apparatus operates.

9. The communication system according to claim 8, wherein the second cycle is longer than the first cycle and the third cycle is longer than the second cycle.

10. The communication system according to claim 2, wherein when the second device receives the pulse signal including the shortest cycle of the plurality of cycles, the operating apparatus ceases operation.

11. The communication system according to claim 3, wherein
a first cycle of the plurality of cycles is the shortest cycle that is set when the abnormality is detected,
a second cycle of the plurality of cycles is set when operation of the operating apparatus is to cease after a predetermined time, and
when a pulse signal including the second cycle is received by the second device, the operating apparatus ceases operation after a predetermined time passes.

12. The communication system according to claim 11, wherein
a third cycle of the plurality of cycles is set when operation of the operating apparatus is allowed, and
when a pulse signal including the third cycle is received by the second device, the operating apparatus operates.

13. The communication system according to claim 12, wherein the second cycle is longer than the first cycle and the third cycle is longer than the second cycle.

* * * * *